United States Patent [19]

Wentzel

[11] Patent Number: 5,074,727

[45] Date of Patent: Dec. 24, 1991

[54] THREADED DEVICE RETAINER

[75] Inventor: Robert M. Wentzel, Elburn, Ill.

[73] Assignee: AT&T Bell Laboratories, Murray Hill, N.J.

[21] Appl. No.: 605,205

[22] Filed: Oct. 26, 1990

[51] Int. Cl.$^5$ .............................................. F16B 39/00
[52] U.S. Cl. .................................. 411/107; 411/111; 411/132; 411/313; 411/999
[58] Field of Search ............... 411/155, 190, 195, 196, 411/202, 203, 260, 261, 313, 314, 352, 353, 368, 371, 531, 544, 913, 111, 112, 132, 133, 134, 147, 148, 151, 152, 153, 107, 999, 103, 149, 533

[56] References Cited

U.S. PATENT DOCUMENTS

| D. 267,123 | 3/1897 | Wagner | 411/190 X |
|---|---|---|---|
| 875,782 | 1/1908 | Cook | 411/260 |
| 1,235,717 | 8/1917 | Moser | 411/313 |
| 1,631,819 | 6/1927 | Ivory | 411/155 X |
| 3,208,495 | 9/1965 | Robbins | 411/260 |
| 4,281,773 | 8/1981 | Mengeu | 411/352 X |

FOREIGN PATENT DOCUMENTS 174982  9/1916  Canada ........................... 411/190

Primary Examiner—Rodney M. Lindsey
Attorney, Agent, or Firm—Dwight A. Marshall

[57] ABSTRACT

Apparatus for retaining a threaded device in association with an article when the article is disengaged from another. The apparatus is intended for mounting on the article and has a center section formed with a center aperture sized for receiving the threaded device. A pair of elongated arm members each extend from opposite edges of the center section and are formed over onto a surface of the center section with an inner edge thereof configured to extend into the center aperture and engage the threaded device when the threaded device is inserted into the center aperture. The elongated arms are in compressed engagement with the surface of the center section when the threaded device secures the article to another article and expand when the threaded device is disengaged from the other article to cooperate with each other in securing the threaded device to the article.

6 Claims, 3 Drawing Sheets

THREADED DEVICE RETAINER

TECHNICAL FIELD

The invention relates to apparatus for retaining a threaded device in association with an article when the article is disengaged from another.

BACKGROUND AND PROBLEM

Threaded devices such as screws and bolts are oftentimes used as fasteners to attach one article to another. Typically, a personal computer has a base member containing disk drives and electronic circuitry that is controlled by a keyboard to display data on a monitor. A cover is attached to the computer base member by threaded devices used to fasten the cover to the base member and which must be removed to disengage the cover from the base member in order to repair or install additional apparatus or circuitry.

A problem arises in that threaded devices are usually separate from the cover and base member and may be lost when they are removed to disengage the cover from the base member. A number of retaining designs have been devised to retain a threaded device with an article. For example, screws have been fabricated with retaining devices to prevent loss of the screws when articles are disengaged from one another. However, such screw retaining devices are expensive to manufacture and are not suitable for inexpensive applications. In another application, screw retaining devices have been devised in the form of a collar having a cylindrical insert with tabs formed to provide a force for retaining the screw. However, such screw retaining devices are expensive to manufacture and are not suitable for inexpensive applications. Accordingly, a need exists for an economical and simple threaded device retainer that can be used in inexpensive applications to retain a threaded device in association with an article when the article is disengaged from another article.

SOLUTION

The foregoing problems are solved by apparatus for retaining a threaded device in association with an article when the article is disengaged from another article. The threaded device retaining apparatus is intended for mounting on the article and has a center section with an aperture therein sized for receiving the threaded device. A pair of elongated arm members each extend from opposite edges of the center section and are formed over and onto a surface of the center section such that an inner edge thereof extends into the center aperture and is configured to engage the threaded device when the threaded device is inserted into the center aperture. The elongated arms are in compressed engagement with the center section surface when the threaded device secures the article to the other article and are expandable upward from the center section surface when the the threaded device is disengaged from the other article to cooperate in securing the threaded device to the article.

DETAILED DESCRIPTION

Figure 2:
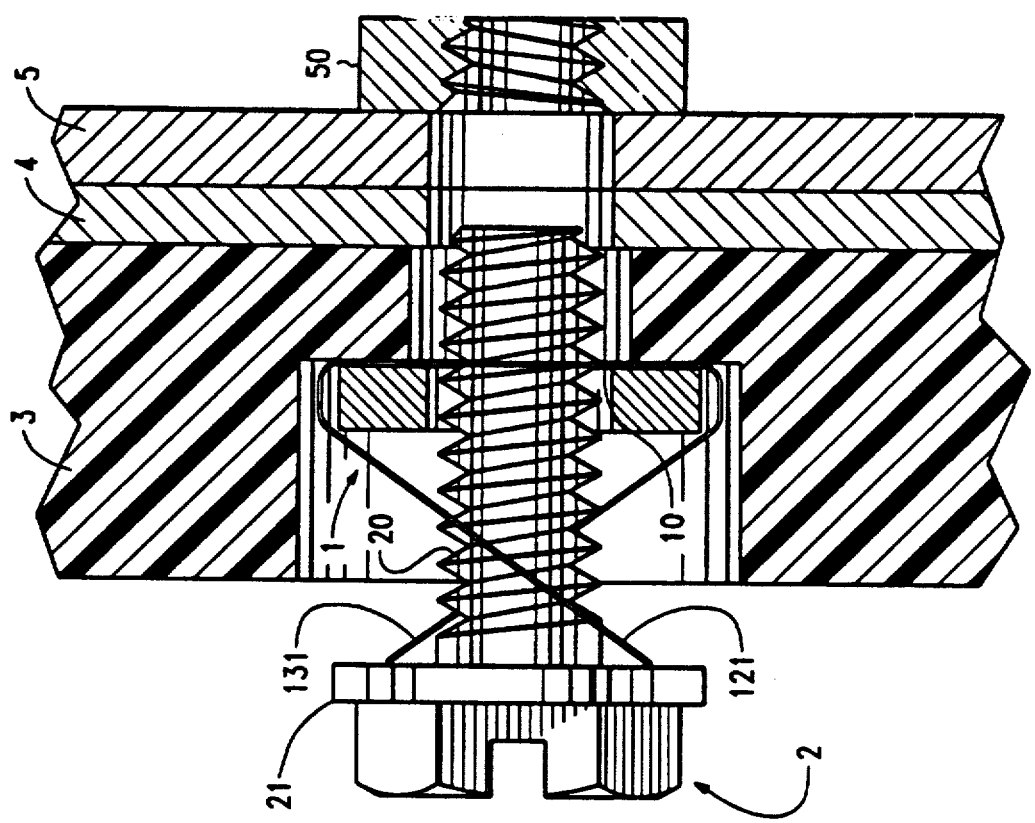
FIG. 2 illustrates the retaining apparatus set forth in FIG. 1 maintaining a threaded device in association with an article after the article has been disengaged from another.
Figure 1:
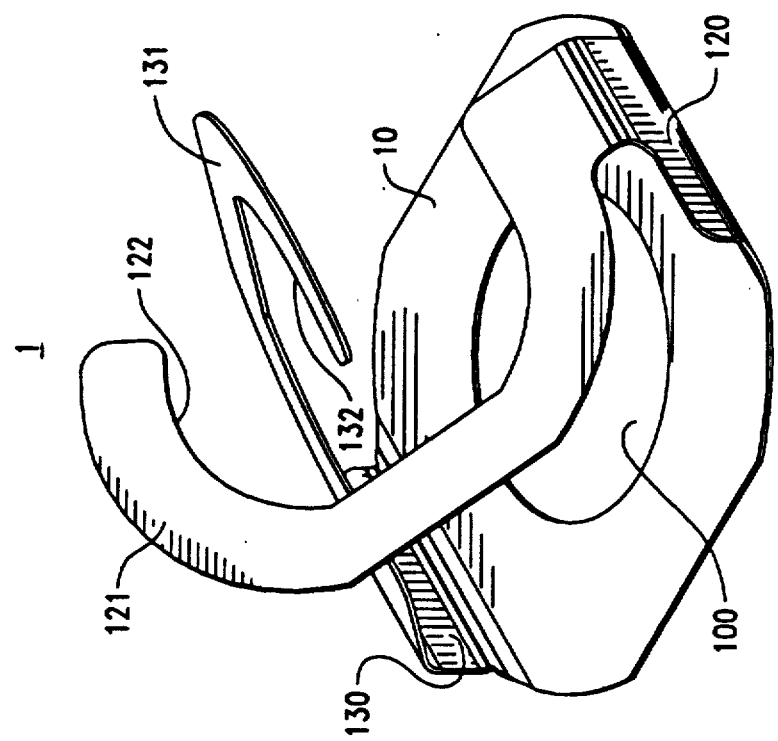
FIG. 1 is an oblique view of threaded device retaining apparatus in accordance with the principles of the invention.

In an exemplary embodiment of the invention, apparatus 1, set forth in FIG. 1 of the drawing, is used for retaining a threaded device 2, FIG. 2, such as a screw or bolt, to an article when the article is disengaged from a second article. Typically, the article may be, although not limited thereto, a plastic cover 3 that is used with another article that may be a personal computer base member 5 covered with a thin protective layer of sheet metal 4. Threaded device 2 is used to assemble cover 3 to base 5 by engaging threaded aperture 50. Operation of threaded device 2 then secures cover 3 to sheet metal layer 4 and base 5.

Retaining apparatus 1, FIG. 1, is used in combination with cover 3 and threaded device 2 to retain threaded device 2 in association with cover 3 when cover 3 is disengaged from sheet metal layer 4 and base 5 by the removal of threaded device 2 from base aperture 50, FIG. 2.

Figure 5:
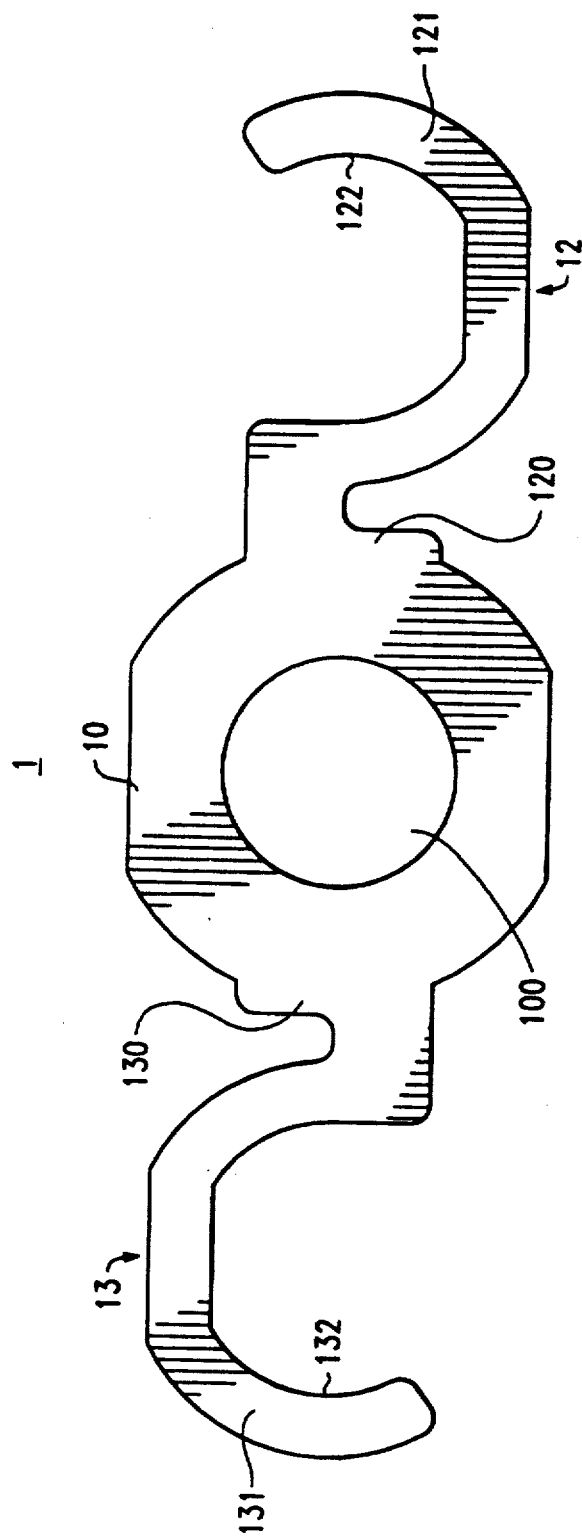
FIG. 5 is a template illustration of the retaining apparatus set forth in FIGS. 1 through 4.

In accordance with a manufacturing template, FIG. 5, retaining apparatus 1 has a generally octagonal configured center section 10 formed with a center aperture 100 sized for receiving threaded device 2. A pair of elongated arm members 12, 13 each extend outward from opposite edges of center section 10 and are formed over the surface of center section 10 to surround center aperture 100. Each arm member 12, 13 has a free end 121, 131 formed with an inner edge 122, 132, respectively, configured to partially extend into the vertical outer circumference defined by center aperture 100. After fabrication, retaining apparatus 1, FIG. 1, is formed such that elongated arms 121, 131 are in a fully expanded position to extend upward in an inclined position with respect to the surface of center section 10 such that the inner edges 122, 132 are positioned just within the vertical outer circumference defined by center aperture 100 and are in a slightly open configuration to initially receive and engage threaded device 2.

In assembling retaining apparatus 1 to cover 3, center section 10 is press-fitted into a receiving cavity of cover 3 such that elongated arms 121, 131 extend upward out of the cover receiving cavity to accept threaded device 2, FIG. 2. When retaining apparatus 1 is affixed to cover 3, octagonal configured center section 10 is positioned such that center aperture 100 is aligned with a corresponding receiving aperture of cover 3. Threaded device 2 is inserted into elongated arms 121, 131 of retaining apparatus 1 by engaging the thread 20 of threaded device 2 with the extended elongated arm members 121, 131 and advancing the end thereof to extend through center section aperture 100.

Figure 4:
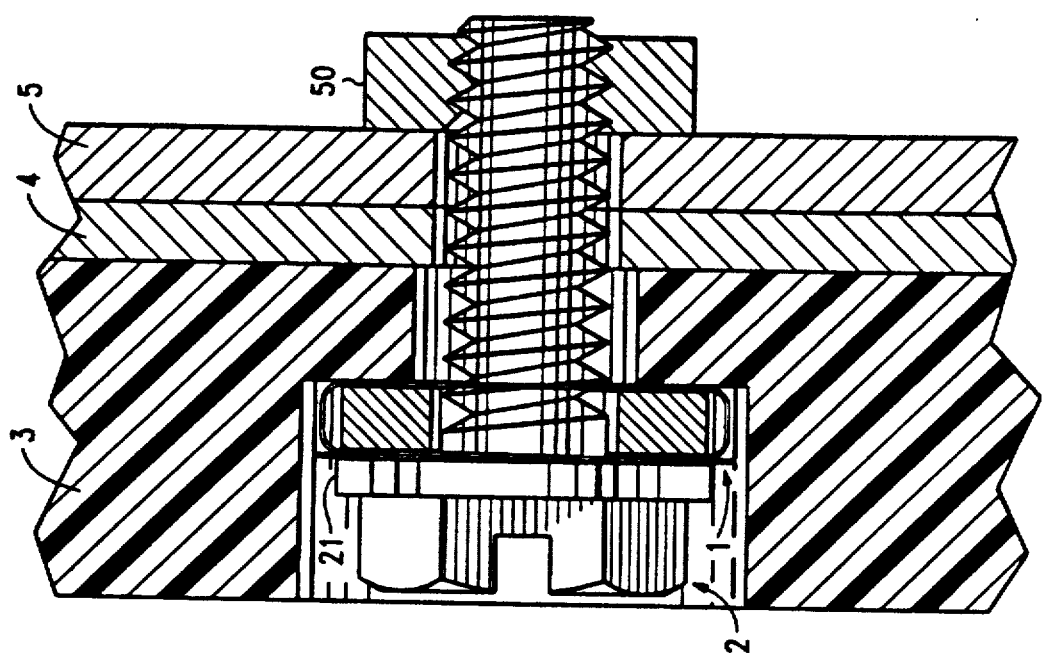
FIG. 4 illustrates the compressed retaining apparatus set forth in FIG. 3 in relationship to a threaded device used in assembling one article to another.
Figure 3:
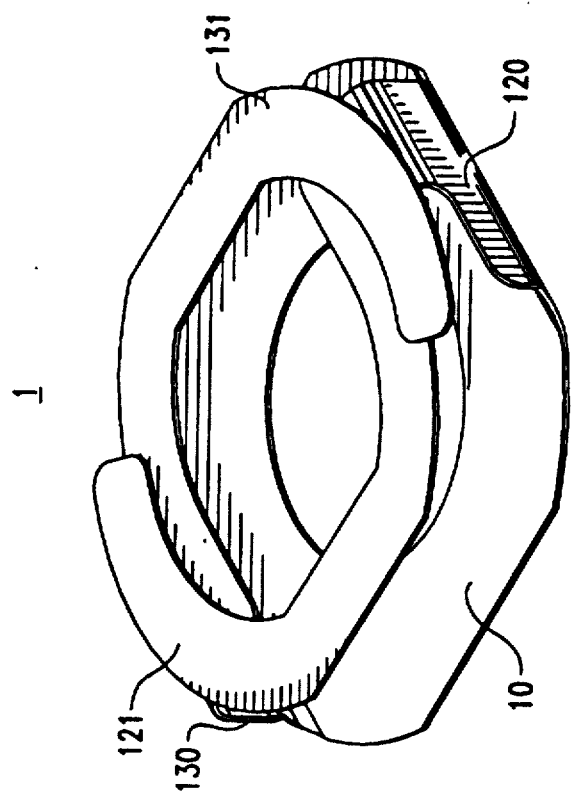
FIG. 3 illustrates a compressed configuration of the threaded device retaining apparatus set forth in FIG. 1.

When cover 3 is properly fitted onto base 5, the retaining apparatus center aperture 100 is aligned with the corresponding receiving aperture of sheet metal layer 4 and with the threaded aperture 50 of base 5. The elongated arm members 121, 131, FIG. 3, are formed in compressed engagement with a surface of center section 10 when threaded device 2 is inserted into the center and receiving apertures and into threaded aperture 50 to secure cover 3 to sheet metal layer 4 and base 5. Upon securing cover 3 to base 5, retaining apparatus 1, FIG. 4, is in a compact configuration with elongated arms 121, 131 compressed by threaded device 2 collar or flange 21 against the surface of center section 10 and closed toward each other to aid in securing threaded device 2 to cover 3.

In removing cover 3 from base 5, threaded device 2, FIG. 2, is disengaged from base threaded aperture 50. Upon disengaging threaded device 2, compressed elongated arm members 121, 131 expand and operate to cooperate with each other such that inner edges 122, 132, FIG. 1, engage with the thread 20 of threaded device 2 to thereby secure threaded device 2 to cover 3 when cover 3 has been disengaged from sheet metal layer 4 and base 5.

In another illustrative embodiment of the invention, retaining apparatus 1, FIG. 1, may be a generally octagonal configured washer member 10 affixed to cover 3 wherein washer member 10 has a center aperture 100 aligned with a receiving aperture of cover 3 and which center aperture 100 is sized for receiving threaded device 2. Elongated arms 121, 131 may be fabricated along with washer member 10 and attached thereto by bending sections 120, 130 or may, in a more substantial configuration, be affixed in any of a number of well-known ways directly to a surface of washer member 10 such that the ends thereof are free to expand or compress as threaded device 2 is disengaged from or engaged with base threaded aperture 50.

I claim:

1. Apparatus for retaining a threaded device in association with an article when the article is disengaged from another wherein the retaining apparatus comprises means for mounting on the article and having a center aperture sized for receiving the threaded device and a pair of opposing members each having an inner edge configured to extend into said center aperture and engage threads of the threaded device when the threaded device is inserted into said center aperture and wherein said members are formed to extend around a surface surrounding said center aperture in compressed engagement with said surface when the threaded device secures the article to another article and which said members expand outward from said surface when the threaded device is disengaged from the other article to secure the threaded device to the article.

2. Apparatus for retaining a threaded device in association with an article when the article is disengaged from another article wherein the retaining apparatus comprises means for mounting on the article and having a generally octagonal configured center section with a center aperture sized for receiving the threaded device and having a pair of arm members each extending from opposite edges of said center section and formed over onto a surface of said center section with an inner edge thereof configured around said center aperture with ends thereof formed to extend into said center aperture and engage threads of the threaded device when inserted into said center aperture and which arm member ends are in compressed engagement with said surface when the threaded device secures the article to the other article and which arm member ends are expandable upward from said surface when the threaded device is disengaged from the other article to secure the threaded device to the article.

3. Apparatus for retaining a threaded device in association with an article when the article is disengaged from another article wherein the retaining apparatus comprises means affixed to the article and having a center aperture sized for receiving the threaded device and having a pair of opposing members each having an inner edge configured around said aperture and having free ends formed to extend into said center aperture and engage threads of the threaded device with said ends formed in compressed engagement with a surface surrounding said aperture to aid in securing the threaded device to the article when the threaded device secures the article to the other article and with said ends expandable upward from said center aperture when the threaded device is disengaged from the other article to secure the threaded device to the article.

4. Apparatus for retaining a threaded device in association with a first article when the first article is disengaged from a second article wherein the retaining apparatus comprises a generally octagonal configured washer member affixed to the first article wherein said octagonal configured washer member has a center aperture aligned with a receiving aperture of the first article and which center aperture is sized for receiving the threaded device, and a pair of arm members each extended from opposite edges of said octagonal configured washer member with each arm member having a free end formed around a surface surrounding said center aperture with an inner edge configured to extend into said aperture and engage threads of the threaded device and which arm members are formed in compressed engagement with said surface of said octagonal configured washer member and aid in securing the threaded device to the first article when the threaded device is inserted into said center and receiving apertures to secure the first article to the second article and which arm members are expandable upward from said surface when the threaded device is disengaged from the second article to cooperate with each other and thereby secure the threaded device to the first article.

5. Apparatus for retaining a screw device to a first article when the first article is disengaged from a second article wherein the screw device retaining apparatus comprises a generally octagonal configured washer member affixed to the first article wherein said octagonal configured washer member has a center aperture aligned with a receiving aperture of the first article and which center aperture is sized for receiving the screw device, and a pair of elongated arm members each extended inward from opposite edges of said washer configured member toward and around a surface surrounding said washer member center aperture with each arm member having a free end with an inner edge thereof configured to extend into said center aperture and engage a thread of the screw device and which arm members are formed in compressed engagement with said surface of said washer member when the screw device is inserted into said center and receiving apertures to secure the first article to the second article and which arm members expand upward from said surface as the screw device is disengaged from the second article to cooperate with each other to thereby secure the screw device to the first article when the first article is disengaged from the second article.

6. The screw device retaining apparatus set forth in claim 5 wherein said pair of elongated arm members each comprise an upper free end surface which extends upward from said washer member surface in a slightly open configuration to initially receive and engage the threads of the threaded screw device when said arm members are expanded outward from said washer member surface and which close toward each other to aid in securing the threaded device to the first article when both arms are in said compressed engagement with said washer surface.

* * * * *